US007499983B2

(12) United States Patent
Acree et al.

(10) Patent No.: US 7,499,983 B2
(45) Date of Patent: Mar. 3, 2009

(54) WEB DISPATCH SERVICE

(75) Inventors: Don Acree, Boise, ID (US); Rian Chipman, Boise, ID (US); Brooklin J. Gore, Boise, ID (US); Craig Kickel, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 733 days.

(21) Appl. No.: 10/140,347

(22) Filed: May 6, 2002

(65) Prior Publication Data

US 2003/0208563 A1 Nov. 6, 2003

(51) Int. Cl.
G06F 15/16 (2006.01)
(52) U.S. Cl. ...................................... 709/219; 709/217
(58) Field of Classification Search ................. 709/217, 709/219
See application file for complete search history.

(56) References Cited

U.S. PATENT DOCUMENTS

| | | | | |
|---|---|---|---|---|
| 5,574,904 | A * | 11/1996 | Yunoki et al. .................. | 707/1 |
| 5,689,697 | A * | 11/1997 | Edwards et al. ................. | 707/3 |
| 5,838,916 | A * | 11/1998 | Domenikos et al. ......... | 709/219 |
| 5,848,424 | A | 12/1998 | Scheinkman et al. ..... | 715/501.1 |
| 6,014,660 | A * | 1/2000 | Lim et al. ....................... | 707/3 |
| 6,202,159 | B1 * | 3/2001 | Ghafir et al. .................... | 726/3 |
| 6,441,834 | B1 | 8/2002 | Agassi et al. ............... | 345/764 |
| 6,446,135 | B1 * | 9/2002 | Koppolu et al. ............. | 719/313 |
| 6,457,012 | B1 * | 9/2002 | Jatkowski .................... | 707/101 |
| 6,480,842 | B1 | 11/2002 | Agassi et al. ................... | 707/4 |
| 6,567,848 | B1 * | 5/2003 | Kusuda et al. ............... | 709/219 |
| 6,651,072 | B1 * | 11/2003 | Carino et al. .................. | 707/10 |
| 6,757,733 | B2 * | 6/2004 | Gupta ........................ | 709/229 |
| 6,961,760 | B2 * | 11/2005 | Li et al. ...................... | 709/219 |
| 7,080,158 | B1 * | 7/2006 | Squire ........................ | 709/245 |
| 2002/0032797 | A1 * | 3/2002 | Xu ............................. | 709/238 |
| 2002/0046170 | A1 | 4/2002 | Gvily .......................... | 705/42 |
| 2002/0078168 | A1 * | 6/2002 | Christfort et al. ........... | 709/217 |
| 2002/0095488 | A1 * | 7/2002 | Primak ....................... | 709/223 |
| 2002/0129149 | A1 * | 9/2002 | Schulz ........................ | 709/226 |
| 2002/0138660 | A1 * | 9/2002 | Eilers et al. ................. | 709/313 |
| 2002/0152210 | A1 * | 10/2002 | Johnson et al. ................ | 707/9 |
| 2003/0078961 | A1 * | 4/2003 | Davis et al. ................. | 709/203 |

OTHER PUBLICATIONS

"15. Redirectors", http://www.squid-cache.org/Doc/FAQ/FAQ-15.html—(viewed web site on Mar. 30, 2004), pp. 1-2.
"A Quick Introduction to WSDL (Windows CE.NET Application Development)", http://msdn.microsoft.com/library, (viewed web site on Mar. 16, 2004),(Feb. 3, 2004),1 page.

(Continued)

Primary Examiner—Kenny S Lin
(74) Attorney, Agent, or Firm—Schwegman, Lundberg & Woessner, P.A.

(57) ABSTRACT

A system and method for accessing an application server includes sending a service command from a requestor to a dispatch server, processing the service command on the dispatch server, translating the service command on the dispatch server into an application request to the application server, wherein the translating is based on a service definition stored on the dispatch server, and processing the application request. In one embodiment, the dispatch server includes a dispatch processor that is further programmed to manage a user interface, wherein the user interface includes a service registration interface, a service modification interface, and a service deletion interface.

20 Claims, 10 Drawing Sheets

OTHER PUBLICATIONS

"Apache HTTP Server Project", http//httpd.apache.org—(viewed web site on Mar. 16, 2004), pp. 1-2.

"Apache Modules—Apache HTTP Server Version 1.3", http://httpd.apache.org/docs/mod/index.html—(viewed web site on Mar. 16, 2004), pp. 1-3.

"Everything You Want in a Portal . . . And Everything You'll Ever Need", *TopTier Software, Inc.*, pp. 1-8.

"Latest SOAP Versions", *SOAP Specifications*—(http://www.w3.org/TR/soap)—viewed web site on Mar. 16, 2004, pp. 1-2.

"Module mod_rewrite URL Rewriting Engine—Apache HTTP Server Version 1.3", http//httpd.apache.org/docs/mod/mod_rewrite.html—(viewed web site on Mar. 16, 2004), pp. 1-22.

"Oasis UDDI Specification TC", http://www.oasis-open.org—viewed web site on Mar. 16, 2004, pp. 1-3.

"Squirm—A Redirector for Squid", http://squirm.foote.com.au/—(viewed web site on Mar. 30, 2004), pp. 1-8.

"Understanding WSDL", *Understanding WSDL (Web Services Technical Articles)*—http://msdn.microsoft.com/library/en-us/dnwebsrv/html—(viewed web site on Mar. 16, 2004), pp. 1-13.

"Universal Description, Discovery and Integration of Web Services", gttoL//www.uddi.org/—viewed web site on Jun. 16, 2004, p. 1 of 1.

"WSDL Specification Index Page", http://msdn.microsoft.com/kibrary/en-us—(viewed web site on Mar. 16, 2004), WSDL Specification Index Page (Bsaeline XML Web Services Specifications/WSDLf),pp. 1-4.

Boubez, Toufic, et al., "UDDI Programmer's API 1.0", *Ariba, Inc., International Business Machines Corp.*, http://www.uddi.org/pubs/ProgrammersAPI-V1.00-Published,(Jun. 28, 2002),pp. 1-68.

Ericsson, Nilo M., "Soap Version 1.2 Part 0: Primer—W3C Recommendation Jun. 24, 2003", *SOAP Version 1.2 Part0:Primer*—http://www.w3.org/TR/soap12-part0/—, viewed web site on Mar. 16, 2004,(2003),pp. 1-47.

Pijanowski, Keith, "Inside WSDL With.NET Attribution", *Inside WSDL with.NET Attribution (Web Services Technical Articles)*—file://C:\Documents%20and%20Settings\kluth\My%20Documents\Inside%20WSDL—(viewed web site on Mar. 16, 2004), pp. 1-16.

Tapang, Carlos C., "Web Services Description Language (WSDL) Explained", *Web Services Description Language (WSDL) Explained (Archived XML Technical Articles)*—http://msdn.microsoft.com/archive/en-us/dnarxml/html, (Jul. 2001),pp. 1-32.

Wessels, Duane, "SQUID Frequently Asked Questions", http://www.squid-cache.org/Doc/FAQ/FAQ/Html—(viewed web site on Mar. 30, 2004), (2001),pp. 1-9.

* cited by examiner

WEB DISPATCH SERVICE

FIELD OF THE INVENTION

The present invention is related to software application management, and more particularly to the translation of simple service requests into complex web links.

BACKGROUND OF THE INVENTION

Computer science has forever grappled with solving the following, contrary statements: systems become more brittle as intelligence is distributed, but systems also become less scalable as intelligence is centralized. How can we enjoy the benefits of distributed scalability with the superior availability and reliability of centralization? There has been a steady evolution of tools and methods to answer this question. The advent of libraries and routines that could be included (linked) in multiple applications migrated to shared libraries that mitigated the need to rebuild every application when a referenced routine was changed. Later, the concept of objects promoted reuse and portability by only exposing necessary methods and properties to the using application. Today, we routinely use object brokers that provide objects as services to applications, further insulating developers from the intricacies of a desired capability while still providing the functionality required.

Another current example is the use of stored procedures to access database information rather than using specific structured query language (SQL) commands in a given application. This moves a large portion of database intelligence out of the application and into the database server, which effectively centralizes more of the intelligence while distributing the capability. A change can be made to the centralized stored procedure to fix a bug or add functionality to all applications that use the procedure without requiring a change to each application itself.

Today, however, we have no similar mechanism for minimizing intelligence required by one web application that needs to access the services of another web application. For example, to display employee information in a web application, one could use an employee lookup program. However, to use that application, one must know things such as the server the application is currently running on, the path to and name of the application, and what information the program needs to provide the desired service. All of this information may be encoded in a Universal Resource Locator (URL) or link. This is not necessarily a lot of information to maintain, but if any of that information changes, the link will break. As the number of copies of this link grow, and if the link itself becomes more complex, then the maintenance could become more significant.

Clearly, the information required by a web application can be even more involved in certain circumstances. For example, enabling applications with Top Tier's Drag and Relate (DnR) capability, while powerful, can require significantly more intelligence in the enabled application. Additionally, most DnR Enabled Applications (DEAs) need to know when they are DnR enabled, since displaying DnR links outside of DnR aware environments could be confusing to the user, and simply won't work if activated. Further, DEAs must encode information into the DnR links so the DnR servers understand what to do with the DnR link. Again, if any of that information changes, then the application will break. This approach becomes untenable in a large enterprise with many applications cross-linking each other.

For the reasons stated above, and for other reasons stated below which will become apparent to those skilled in the art upon reading and understanding the present specification, there is a need for the present invention.

SUMMARY OF THE INVENTION

One aspect of the present invention provides a dispatch server that includes a data store having one or more entries that contain application service information, and a dispatch processor operatively coupled to the data store, wherein the dispatch processor is programmed to translate an application service to an application address. In some embodiments, the dispatch processor is further programmed to manage a user interface, wherein the user interface includes a service registration interface, a service modification interface, and a service deletion interface.

Another aspect of the present invention provides a method for addressing an application server. The method includes sending a service command from a requester to a dispatch server, processing the service command on the dispatch server, translating the service command on the dispatch server into a application address, redirecting the application address to the requester, and accessing the application server. In some embodiments, the application address is a complex address. In some embodiments, the processing of the service command includes validating the service command. In some embodiments, the processing of the service command includes checking the service command for parameters.

Another aspect of the present invention provides a system that includes a dispatch server and a service user. The dispatch server includes a data store, and a processor programmed to translate a service request into an application command. The service user is operatively coupled to the dispatch server, wherein the service user sends the service request to the dispatch server, and wherein the dispatch server translates the service request and sends the application command to the service user.

Another aspect of the present invention provides a system that includes a dispatcher and an service provider. The dispatcher includes a data store, and a processor programmed to translate a service request into an application address and manage a user interface, wherein the user interface includes a service registration. The service provider is operatively coupled to the dispatcher, wherein the service provider registers its services with the dispatcher through the user interface.

Another aspect of the present invention provides a method for centralized management of complex web links on a web dispatch provider. The method includes storing application service definitions and complex web link data in a centralized database of the web dispatch provider, receiving service requests from a browser, sending redirected application requests to a browser, and changing the complex web link data in the centralized database without changing the application service definitions.

Another aspect of the present invention provides a method for registering services on a web dispatch server. The method includes sending a registration request from an application server to the web dispatch server, the registration request having a first service name, processing the registration request on the web dispatch server, registering a new service for the registration request on the web dispatch server, the new service having a second service name, and storing the new service in a web dispatch database, such that a user can access the new service of the application server by sending a service request to the web dispatch server.

BRIEF SUMMARY OF THE DRAWINGS

In the following drawings, where the same number reflects similar function in each of the drawings.

DETAILED DESCRIPTION

Figure 1A:
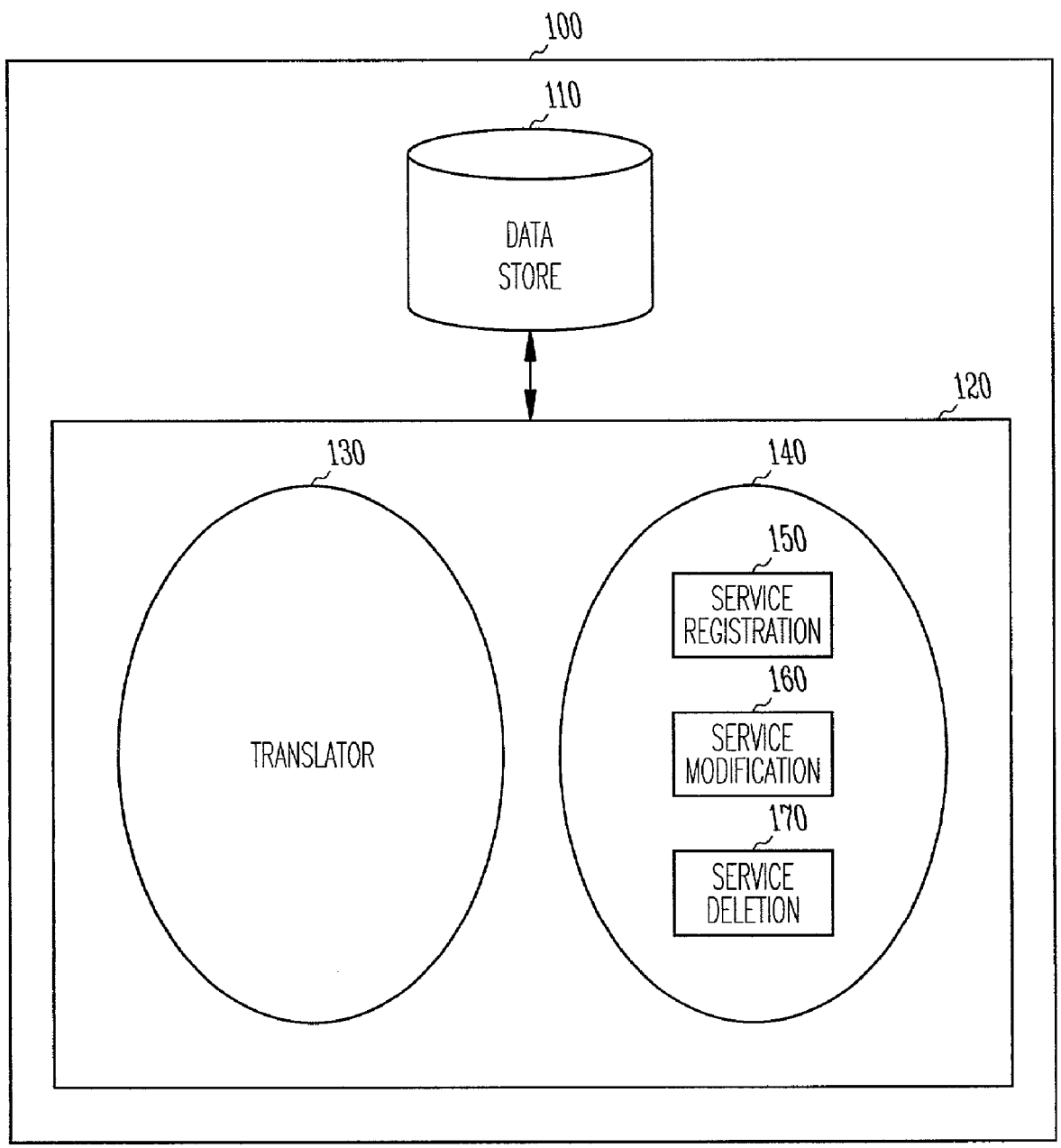
FIG. 1A is a high-level component view of a dispatch server according to one embodiment of the present invention.

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. In certain embodiments, reference is made to certain outside technologies to exemplify the utility of these embodiments of the invention. These technologies are not associated with, or required by, these embodiments of the invention for operation, but are described only to demonstrate the flexibility and utility of these embodiments of the invention in various operating environments. The following detailed description is not to be taken in a limiting sense, and the scope of the present invention is defined by the claims.

INTRODUCTION

It is interesting to consider web pages and applications in terms of objects and transactions. One can consider a single, static web page as a simple object with a single method called "display my contents." The method is invoked via the web link for that page. Web pages generated by an application are just slightly more complex objects that now include zero or more properties. These properties are sent to the application in the link itself or through other data that a browser can send to the link's destination. Thus, the method of an application is just a bit more complex and may be called something like "display my contents based on my properties."

By the nature of the environment, web applications are transaction-based. A web application is nothing more than a collection of web pages presented to a browser with a common look, feel, and purpose. The web environment itself neither cares nor knows about any application, and is, in fact, stateless. The web is only concerned with requests and responses. Using an employee lookup program (i.e. white pages) example, an entry page might present a list of many things that can be done, such as looking up an employee by last name (or by user-name or employee number), or searching the phone book for phone numbers, parts of names, etc. In fact, each of these capabilities is a transaction that may be executed independent of the others as long as the correct information is passed to the right server.

This object and transaction orientation makes the web very flexible and powerful. This same capability, however, can also cause reliability, availability, and scalability (RAS) issues in an enterprise if not carefully managed. RAS issues have been around in the software development field for many years, and new technologies have evolved over time to address them. Such technologies are less mature in the web environment. Certain embodiments of the present invention described below apply some of the lessons learned in traditional software development to a web environment of linked objects and transactions.

DESCRIPTION OF THE PREFERRED EMBODIMENTS

FIG. 1A is a high-level component view of a dispatch server comprising a computer-readable medium for storing instruction according to one embodiment of the present invention. In this embodiment, dispatch server 100 is located on the World Wide Web, and includes data store 110 and dispatch processor 120. Dispatch processor 120 includes translator 130 and service management (user) interface 140, and is operatively coupled to data store 110. Data store 110 has one or more entries that contain application service information, and dispatch processor 120 is programmed to translate an application service request via translator 130 into an application address. In this embodiment, service management interface 140 includes service registration 150, service modification 160, and service deletion 170. Dispatch processor 120 is further programmed to manage service management interface 140. Dispatch server 100 shown in FIG. 1A has various functionalities. In different embodiments, dispatch server 100 includes functionalities for service-to-application translation, service registration, service availability, parameter formatting, parameter completion (or defaults), method translation, and source routing. Service-to-application translation enables a link to reference a service, rather than a particular application with all its required parameters, etc. Service registration allows new applications to register their services and usages. Service availability allows users to discover which services are available from different application providers. Service modification allows applications to modify or delete their services after registration. Parameter formatting allows a link to contain parameters without knowledge of the required format of those parameters, and also allows support for different formatting of the same parameter for different applications. Parameter completion allows links to include only a subset of all required parameters to a target application. Method translation allows links to include parameters for target applications without knowledge of the method required.

Figure 1B:
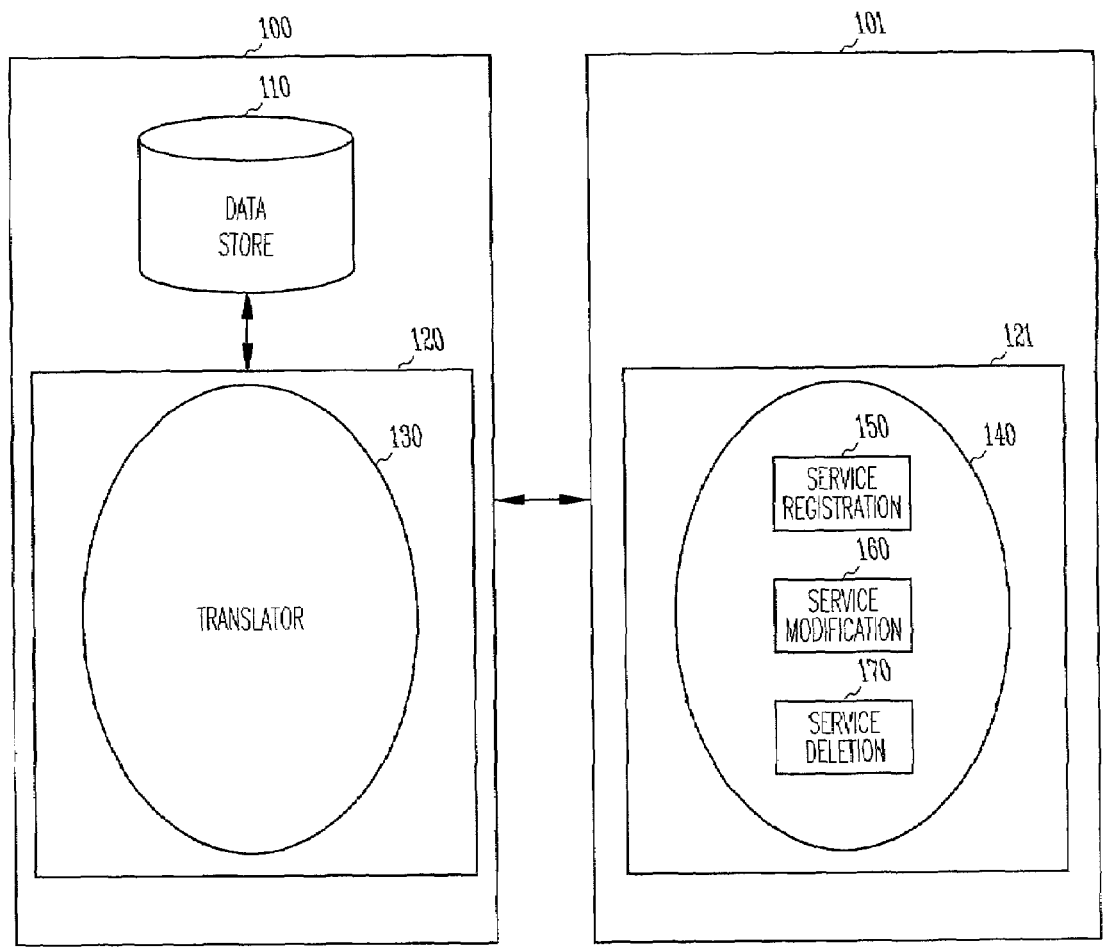
FIG. 1B is a high-level component view of a dispatch server and an additional server according to another embodiment of the present invention.

FIG. 1B is a high-level component view of a dispatch server and an additional server according to another embodiment of the present invention. In this embodiment, service management interface 140 is included in a separate and distinct run-time server 101 than dispatch server 100. Server 101 is operatively coupled to dispatch server 100. Server 101 includes processor 121. Processor 121 is programmed to manage service management interface 140. This dual-server architecture improves stability of the overall run-time system. One server, such as server 101, may go down while the dispatch server 100 is still functional. In this scenario, applications could not register, modify, or delete services on server 101, but clients could still invoke services on dispatch server 100. Considering the potential high transaction-rate of dispatch server 100, one embodiment includes a system with dispatch server 100 as a large-scale server, and server 101 as a cheaper, smaller platform.

In the embodiments shown in FIGS. 1A and 1B, dispatch server 100 is very flexible, such that it can operate in many different types of environments. Certain environments require specific application service message protocols and language definitions. Dispatch server 100 functions within these environments, wherein the application servers implementing any specific protocols or service language definitions will interface cleanly with dispatch server 100 during run-time operation.

Figure 2:
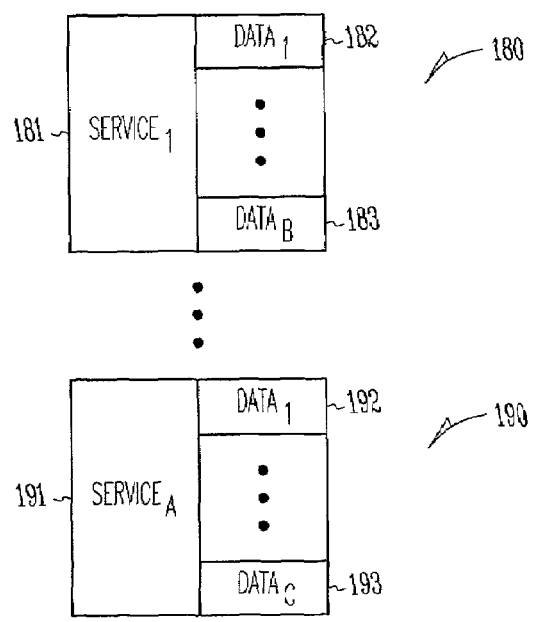
FIG. 2 is a detailed view of a set of entries in a data store of the dispatch server according to one embodiment of the present invention.

FIG. 2 is a detailed view of a set of entries in a data store of the dispatch server according to one embodiment of the present invention. In this embodiment, data store 110 includes entries 180 through 190 that contain application service information about $service_1$ through $service_A$. Entry 180 includes information about a first application service 181 ($service_1$). The information of entry 180 corresponding to $service_1$ 181 is contained within data entry 182 ($data_1$) through data entry 183 ($data_B$). Data entries 182 through 183 include various data information about $service_1$ 181. Data entries 182 through 183 includes information that is specific to $service_1$ 181, and are referenced by dispatch processor 120 of dispatch server 100. In some embodiments, data entries 182 through 183 include definitions for enablement and disablement of $service_1$ 181. $Service_1$ 181 is a service that has been registered on dispatch server 100 by an application provider. Data entries 182 through 183 can dynamically change over time, such that the definition of $service_1$ 181 is configurable. Entry 190 includes information about an $A^{th}$ application service 191 ($service_A$). The information of entry 190 corresponding to $service_A$ 191 is contained within data entry 192 ($data_1$) through data entry 193 ($data_C$). Data entries 192 through 193 include various data information about $service_A$ 191. Data entries 192 through 193 includes information that is specific to $service_A$ 191, and are referenced by dispatch processor 120 of dispatch server 100. In some embodiments, data entries 192 through 193 include definitions for enablement and disablement of $service_A$ 191. $Service_A$ 191 is a service that has been registered on dispatch server 100 by an application provider. Data entries 192 through 193 can dynamically change over time, such that the definition of $service_A$ 191 is configurable.

Figure 3A:
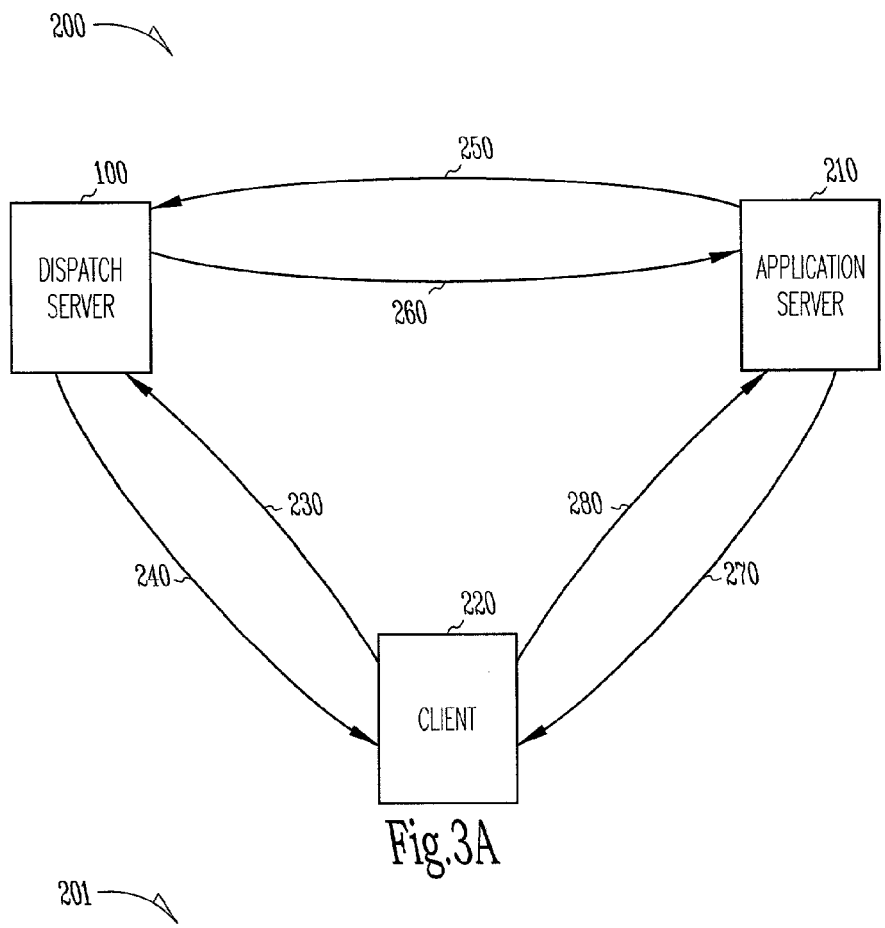
FIG. 3A is a block diagram illustrating a system that includes a dispatch server, an application server, and a client, according to one embodiment of the present invention.

FIG. 3A is a block diagram illustrating a system that includes a dispatch server, an application server, and a client, according to one embodiment of the present invention. In this embodiment, system 200 includes dispatch server 100, application server 210, and client 220. In some embodiments, client 220 may also be an application server. Dispatch server 100 is operatively coupled to both application server 210 and client 220. Client 220 is operatively coupled to both dispatch server 100 and application server 210. Application server 210 is operatively coupled to both dispatch server 100 and client 220. System 200 provides client 220 with the ability to address application server 210. Client 220 sends service request 230 to dispatch server 100. Dispatch server 100 processes service request 230 and translates service request 230 into an application request 240. Dispatch server 100 redirects application request 240 back to client 220. Client 220 receives application request 240 and forwards it as application request 280 to application server 210. Application server 210 processes application request 280, and sends application response 270 to client 220. In system 200, client 220 is an end-user.

This embodiment provides several advantages. First, system 200 is more reliable, because the transaction time between client 220 and dispatch server 100 is quite small. Dispatch server does not need to maintain state information about its transaction with client 220, and therefore the transaction rate can be quite high. Second, system 200 provides a clearer security model, because client 220 directly invokes application request 280 to application server 210 (i.e. dispatch server 100 redirects application request 240 back to client 220, rather than sending it to application server 210). This provides a clearer security model and eases cookie management.

To further exemplify the advantages of this embodiment, we can use two analogies. The first analogy is that of a taxi service. Aside from not having to drive, a key benefit is that we don't need to know where a destination is, or how to get there. We can just hop in and ask to be taken to a certain location, and a while later, we arrive there. For less common destinations, we may have to provide a specific address to the taxi driver, but we still don't have to know how to get there. And, for generic locations, we may not even need to know the name of the location. For example, we might just say to the taxi driver, "Take me to the closest book store." This is an example of how we minimize the information we need to do something (i.e. get to a destination) by relying on another source (i.e. the taxi driver) for that information.

The second analogy is that of a vacation in Mexico. Let's say you decide to vacation in Mexico and don't speak Spanish, but your traveling companion does. While in a restaurant, you need to use a restroom (which you are quite certain that the restaurant has). You ask your traveling companion for help. She tells you how to ask for the restroom in Spanish, and further informs you that you can ask a clerk in the restaurant, such that the clerk will understand your request, and also be able to give you a correct response (as to how to find the restroom). There are at least two important points in this analogy: (1) your traveling companion did not ask for you, but told you how to ask, and (2) your traveling companion also told you where to ask. By correctly formatting (and redirecting) an application request in this embodiment, the dispatch server is basically telling you how and where to ask. By returning the application request in a redirect message, the dispatch server is letting the client make the request, not actually calling the target application server directly.

In some embodiments, application requests 240 and 280 are complex addresses. In other embodiments, service request 230 includes a URL. In other embodiments, the processing of service request 230 on dispatch server 100 includes validating service request 230, and checking service request 230 for parameters.

In the embodiment shown in FIG. 3A, application server 210 also sends user interface commands 250 to dispatch server 100. These user interface commands 250 will be processed by the user interface of dispatch server 100, and then user interface responses 260 will be sent back to application server 210. In this way, application server 210 can register services on dispatch server 100. In another embodiment, application server 210 can modify and delete services on dispatch server 100. In this way, service definitions can change without having to change service requests. Dispatch server 100 has centralized management of complex web links, such that client 220 sends the same service request 230 to dispatch server 100 after the service definitions have changed. In some embodiments, client 220 sends additional commands to dispatch server 100 to discover which services are currently available.

Figure 3B:
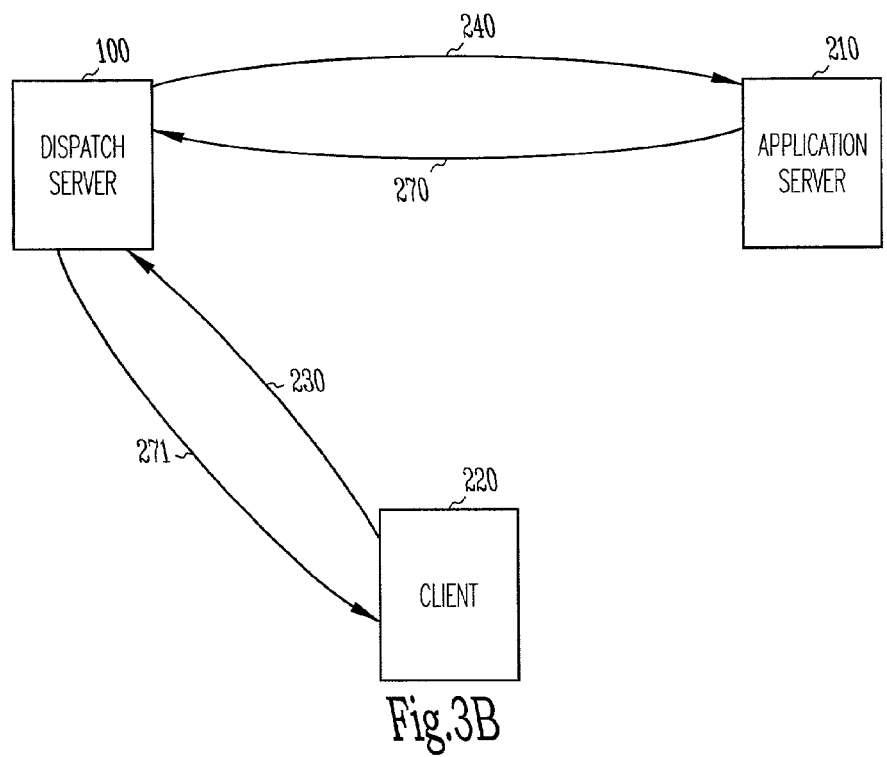
FIG. 3B is a block diagram illustrating a system that includes a dispatch server, an application server, and a client, according to another embodiment of the present invention.

FIG. 3B is a block diagram illustrating a system that includes a dispatch server, an application server, and a client, according to another embodiment of the present invention. In this embodiment, system 201 includes dispatch server 100, application server 210, and client 220. Dispatch server 100 directly sends application request 240 to application server 210. Application server 210 processes application request 240, and sends application response 270 back to dispatch server 100. Dispatch server includes an amount of state information, so that it can send application response 271 to client 220. In this case, dispatch server 100 acts substantially similar to a reverse proxy. Client 220 never needs to know the exact address of application server 210, nor does it need send requests to application server 210. Dispatch 100 handles all of the transactional work with application server 210. Client 220 only needs to send simple service requests to dispatch server 100, and in one embodiment, these requests can easily be bookmarked as URL favorites on client 220.

Figure 3C:
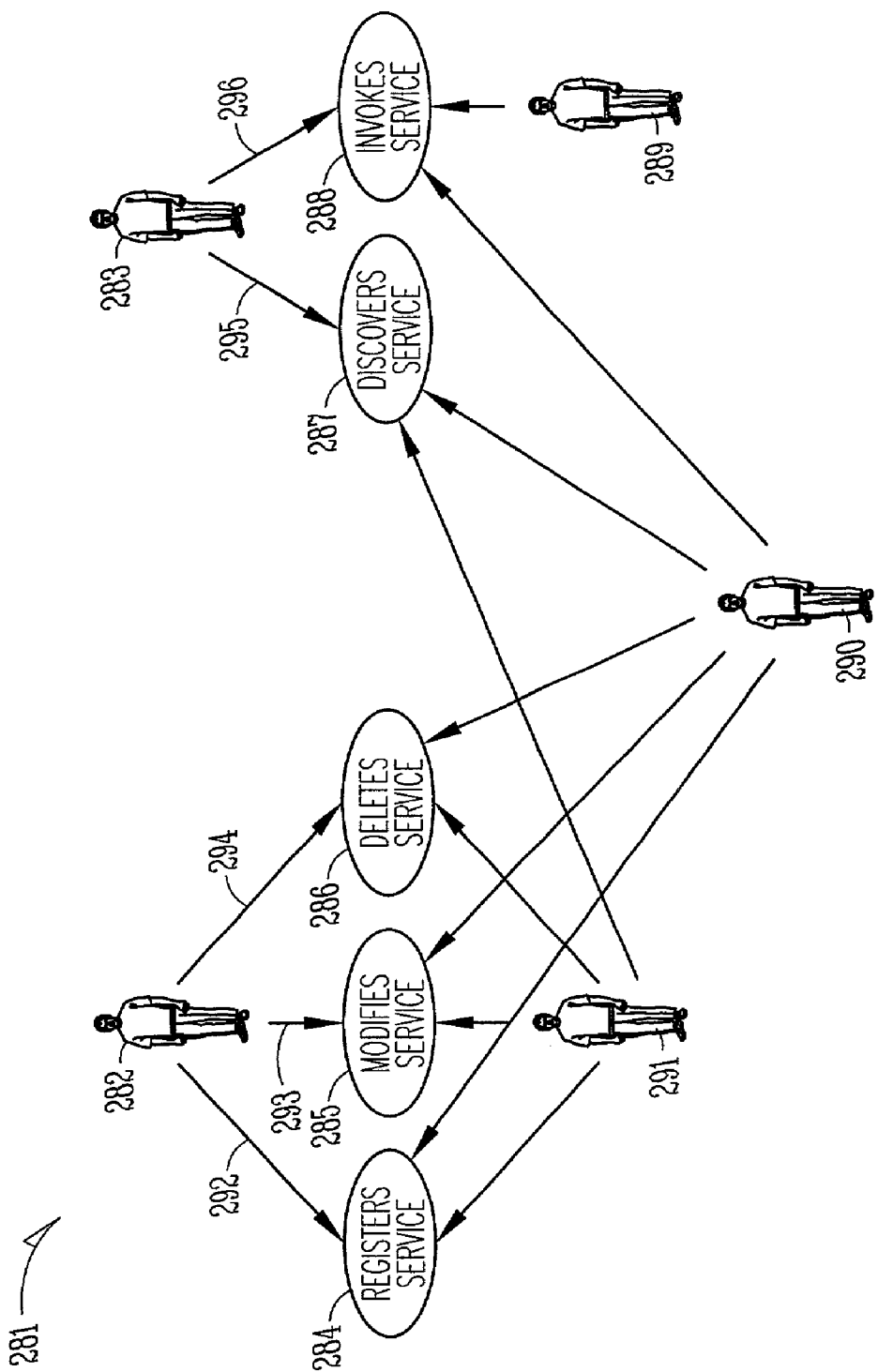
FIG. 3C is a use-case diagram illustrating various use cases in different embodiments of the present invention.

FIG. 3C is a use-case diagram illustrating various use cases in different embodiments of the present invention. In this embodiment, use-case diagram 281 shows use cases involving a service user 283 and a service provider 282. In one use case, service provider 282 implements use 292 for use case 284 to register a service on a dispatch provider. User interface 291 aids in the registration process. Database 290 is updated to include the new service. In another use case, service user 283 implements use 296 for use case 288 to invoke a service on the dispatch provider. Dispatcher 289 handles the service request sent from service user 283, and database 290 is used to query information about the requested service.

In another embodiment, service user 283 implements use 295 for use case 287 to discover available services on the dispatch provider. User interface 291 aids in the discovery process, and database 290 is used to query information about available services on the dispatch provider.

In another embodiment, service provider 282 implements use 293 for use case 285 to modify an existing service on the dispatch provider. User interface 291 aids in the modification process, and database 290 is updated for the modified service.

In another embodiment, service provider 282 implements use 294 for use case 286 to delete an existing service on the dispatch provider. User interface 291 aids in the deletion process, and database 290 is updated to delete the indicated service.

Figure 4:
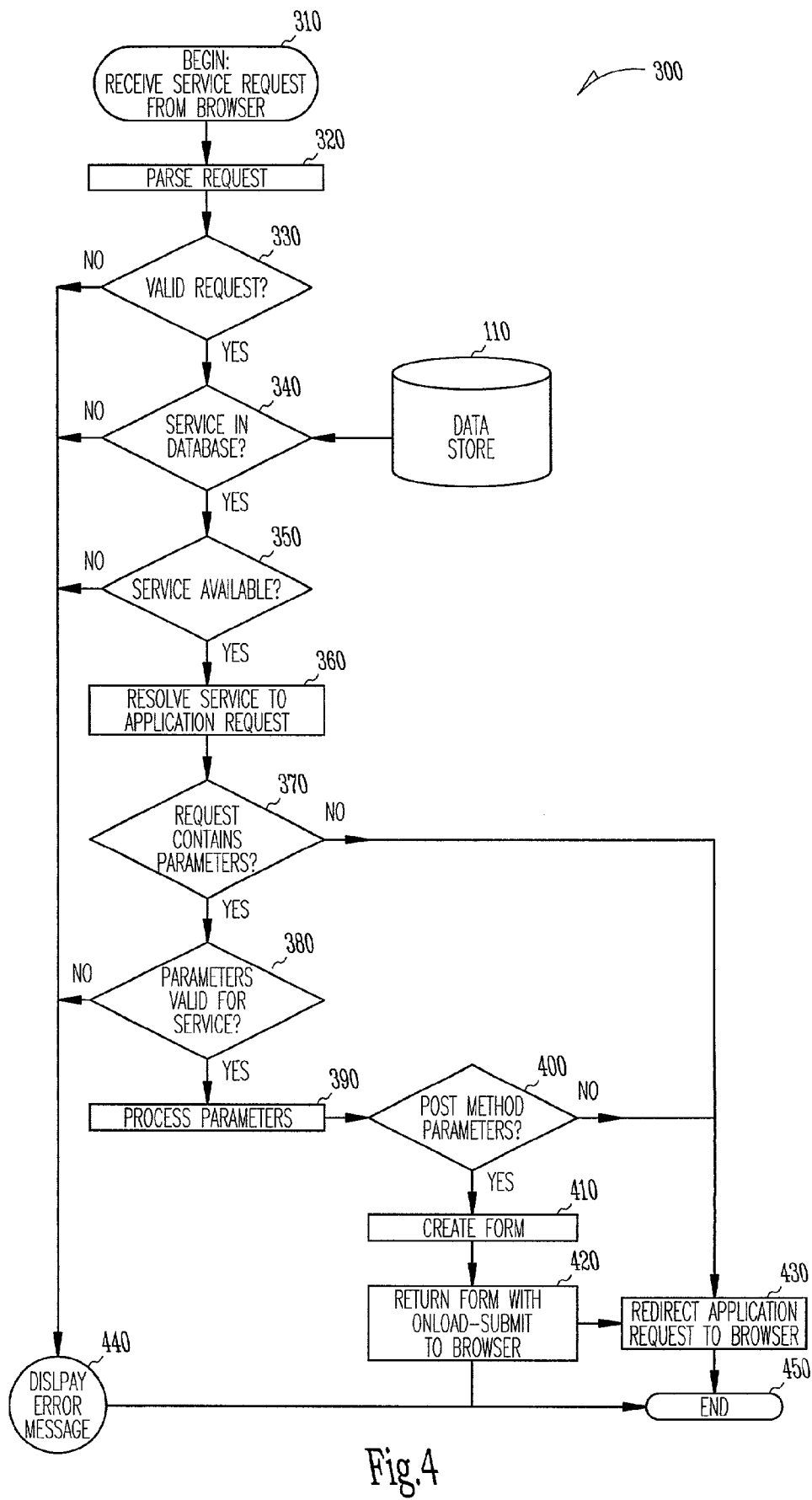
FIG. 4 is a flow chart illustrating a method for translating service requests into application requests according to one embodiment of the present invention.

FIG. 4 is a flow chart illustrating a method for translating service requests into application requests according to one embodiment of the present invention. In this embodiment, flow diagram 300 begins with step 310, when dispatch server 100 receives a service request from a browser. In step 320, dispatch server 100 parses the request to determine the format and contents of the request. At checkpoint 330, dispatch server 100 determines if the service request is valid. If it is not, an error message is displayed, and an error is returned to the browser. If the service request is valid, dispatch server then checks if the service invoked by the service request is in data store 110 at checkpoint 340. Data store 110 contains service data entries (definitions) for each of the services registered on dispatch server 100. If the service is not located in data store 110, an error message is displayed, and an error is returned to the browser. If the service is in data store 110, then dispatch server next determines if the service is available at checkpoint 350. If the service is not available, an error message is displayed, and an error is returned to the browser. If the service is available, step 360 then resolves the service request into an application request. To do this, dispatch server 100 references data store 110 to determine the service definitions that are relevant to the invoked service. At checkpoint 370, dispatch server 100 determines if the service request contains any parameters. If the request does not contain any parameters, then dispatch server redirects the application request to the browser in step 430. If the request does contain parameters, then dispatch server determines if the parameters are valid for the indicated service at checkpoint 380. Again, dispatch server references data store 110 in determining if these parameters are valid for the particular service in question. If the parameters are invalid, an error message is displayed, and an error is returned to the browser. If the parameters are valid, dispatch server 100 processes the parameters in step 390. At checkpoint 400, dispatch server determines if any of the parameters are POST method parameters. As will be described in more detail below, parameters may be passed to an application server via the POST method, which passes parameters in data (other than in the URL) that is sent to the application server. If there are no POST method parameters, then dispatch server 100 redirects the application request to the browser in step 430. If there are POST method parameters, then dispatch server 100 creates a form using these parameters in step 410. In step 420, dispatch server 100 returns the form with an invocation of the onload event that calls the form's submit method, and then redirects the application request (which includes the form) to the browser in step 430. Flow diagram 300 ends with step 450.

Figure 5A:
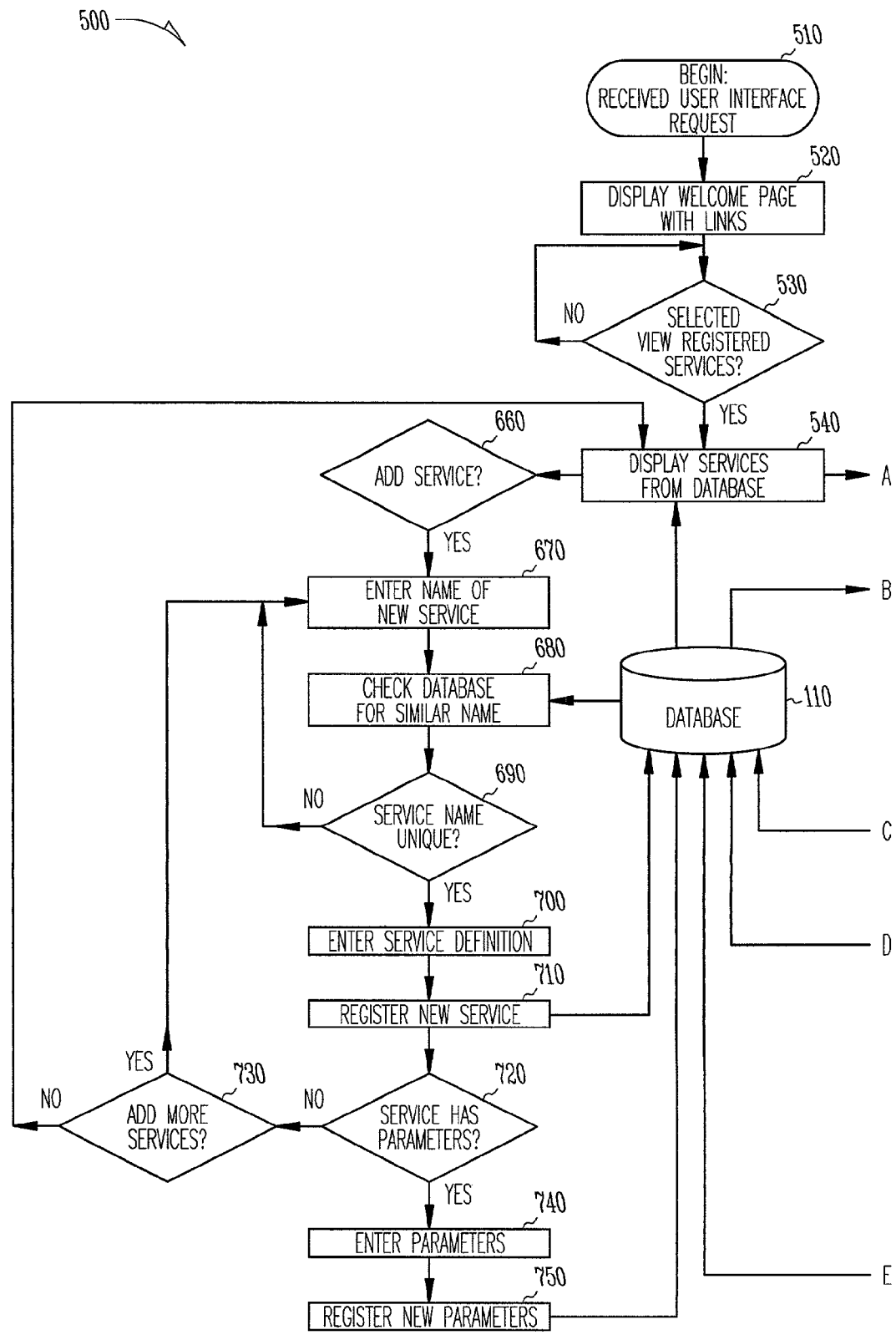
FIG. 5A is a flow chart illustrating a method for managing services through a user interface of a dispatch server according to one embodiment of the present invention.
Figure 5B:
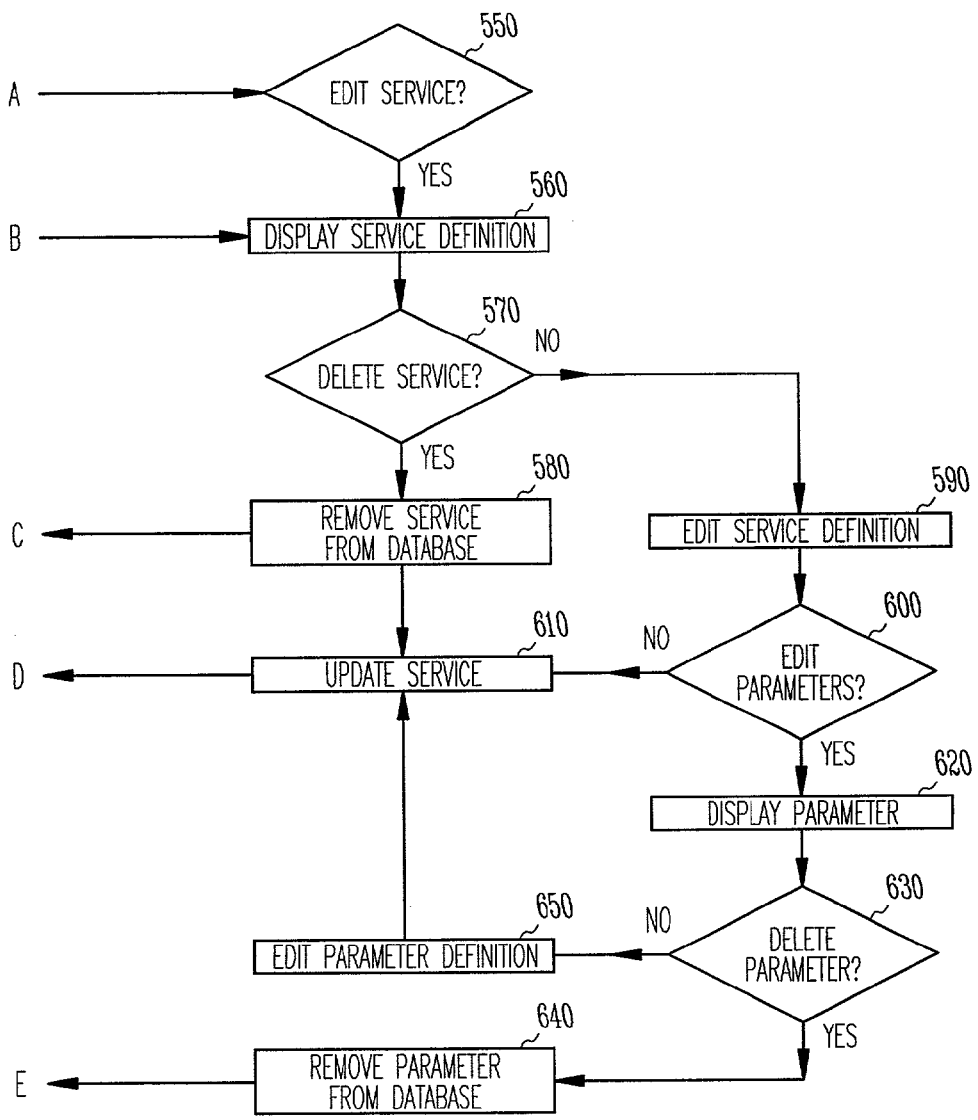
FIG. 5B is a continuation of the flow chart shown in FIG. 5A illustrating a method for managing services through a user interface of a dispatch server according to one embodiment of the present invention.

FIGS. 5A and 5B (hereinafter referred to collectively as FIG. 5) show a flow chart illustrating a method for managing services through a user interface of a dispatch server according to one embodiment of the present invention. In this embodiment, user interface requests can be used to add, delete, and modify services and service definitions on the dispatch server. Flow diagram 500 begins with step 510, when a user interface request is received by the dispatch server. As discussed earlier, this user interface request will be sent to the dispatch server from an application server. In step 520, a welcome page with links will be displayed on dispatch server 100. At checkpoint 530, dispatch server 100 determines if the user interface request has made a selection to view registered services on dispatch server 100. After such a selection is made, dispatch server 100 displays all available services from database 110. Database 110 includes information for all currently registered services on dispatch server 100.

At checkpoint 660 of FIG. 5, dispatch server 100 determines if the user interface request includes a request to add a new service. If the request is to add a new service, step 670 enters the name of the new service from the request. In one embodiment, the request is parsed to extract the new service name. Step 680 checks database 110 for a similar service name. Database 110 includes information for all currently registered services on dispatch server 100. At checkpoint 690, dispatch server 100 determines if the new service name is unique from other service names currently registered in the system. If the name is not unique, control is returned to step 670 to enter another name for the new service. If the name is unique, then step 700 enters the service definition from the user interface request. In one embodiment, the user interface request is parsed to extract the service definition. After the service definition has been entered, the new service is registered in step 710 into database 110. Database 110 at this point contains the service definition for the new service. At checkpoint 720, dispatch server 100 determines if the service has parameters. If it does not, then dispatch server 100 determines if any more services are to be added at checkpoint 730. If the service does have parameters, then the parameters are entered in step 740. In one embodiment, the user interface request is parsed to extract the parameters. In step 750, the new parameters are registered into database 110 for the new service.

At checkpoint 550 of FIG. 5, dispatch server determines if the user interface request includes a request to edit an existing service. If the user interface request includes such a request, then step 560 queries database 110 to display the current service definition for the given service. In one embodiment, the user interface request is parsed to extract service information. At checkpoint 570, dispatch server 100 determines if the user interface request includes a request to delete a service. If it does not, the service definition is edited at step 590. Then, at checkpoint 600, dispatch server 100 determines if the parameters are to be edited. If they are not, then the service is updated in step 610 and database 110 is also updated for the edited service. If the parameters are to be edited at checkpoint 600, then current parameters are displayed in step 620. At the next checkpoint 630, dispatch server 100 determines if a parameter is to be deleted. If not, then the parameter definitions are edited in step 650, and the service is updated in step 610 (such that database 110 is updated). If the parameter is to be deleted, then the parameter is removed from database 110 in step 640. If dispatch server 100 determines that the service is to be deleted at checkpoint 570, then the enter service is removed from database 110 in step 580.

Figure 6:
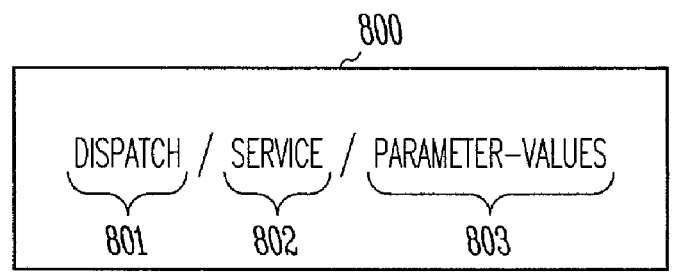
FIG. 6 is a textual view of an example of a service request sent to a dispatch server according to one embodiment of the present invention.

FIG. 6 is a textual view of an example of a service request sent to a dispatch server according to one embodiment of the present invention. In this embodiment, the core feature provided by the dispatch server is the ability to abstract the details of a specific web address into a generic service definition that hides much of the intelligence typically required in a link. Service request 800 shows the basic format for linking to a web application that is defined as a dispatch service. Textual element 801 of service request 800 is the name of the dispatch server. Textual element 802 of service request 800 is the name of a registered service on the dispatch server. Textual element 803 of service request 800 contains the parameters and/or values required for the indicated service. Thus, in this embodiment, a service request 800 sent to a dispatch server includes a dispatch server name, a registered service name, and parameter values. In some embodiments, the service request includes only a dispatch server name and a registered service name.

Figure 7:
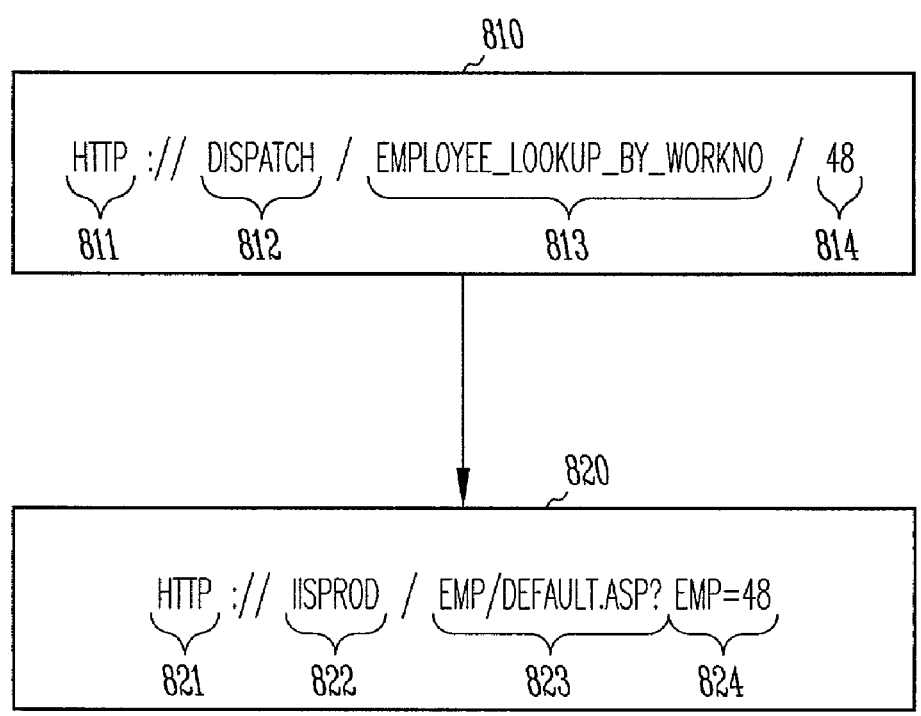
FIG. 7 is a textual view of an example of a translation of a service command into an application command according to one embodiment of the present invention.

FIG. 7 is a textual view of an example of a translation of a service command into an application command according to one embodiment of the present invention. In this embodiment, an example of an employee lookup program is used to demonstrate the service-to-application translation capabilities of the dispatch server. Service command 810 is translated into application command 820 by a dispatch server. Textual element 811 of service command 810 is the communication protocol. Textual element 812 of service command 810 is the name of the dispatch server. Textual element 813 of service command 810 is the name of a registered employee lookup service on the dispatch server. At some previous time, the client who has sent this service command has discovered this service by name on the dispatch server. Textual element 814 of service command 810 is the parameter required by the service indicated by textual element 813. This parameter can be sent directly in service command 810. The dispatch server of this embodiment of the invention translates the service command 810 into application command 820. Application command 820 includes textual elements 821, 822, 823, and 824. Textual element 821 is the communication protocol. Textual element 822 is the name of the server running the particular application. Application command 820 is sent to this server. Textual element 823 is the path and name of the application running on the server. Textual element 824 is the information that the application needs in order to return the desired information for employee number 48.

In this embodiment, service registration and request redirection functionalities allow the dispatch server to translate service command 810 into application command 820. Before service command 810 arrives at the dispatch server, the employee lookup application owner must register the "employee_lookup_by_workno" service with the dispatch server, including a required parameter "emp" that designates a single employee number. Additionally, during registration, dispatch server must store data for the given service indicating that the program "emp/default.asp" on server "iisprod" must be invoked with a single parameter "emp." Parameters may be passed to an application using a GET method, and also may be passed using a POST method. The GET method passes parameters to an application directly in the address (e.g. URL). The POST method passes parameters in other data that is sent to the application. In the present embodiment, the parameter "emp" is passed using the GET method. In some embodiments, the dispatch server also stores data for the given service that associates a description and owner with the service, and this information is provided to clients during service discovery.

After service registration, a client sends service command 810 to the dispatch server. After service command 810 is translated into application command 820 by the dispatch server, application command 820 is redirected back to the client. By sending the client back the application command in a redirect message, the dispatch server lets the client make the request to the application server directly. This approach has certain benefits. After the dispatch server has translated the request, it is basically done. This involves a simple database query and some possible data formatting, all of which can be done quite quickly. The dispatch server then sends a small amount of data back to the client. It does not have to wait for the target application to respond, nor does it route the results from the target application back to the client. This means that the dispatch server does not need to maintain any state information, and that the dispatch server will be able to handle many service commands per second. Further, the application command redirection approach minimizes the network path (and traffic) for the results to get from the target application back to the client. It also is important for usage logging, access tracking, and security management.

In another embodiment, the dispatch server directly sends application command 820 to the application server, and routes an application response back to the client. In this embodiment, the dispatch server would need to maintain some state information.

In yet another embodiment, the service registration process is at least partially automated. In this embodiment, a dispatch interface is designed so that an application can register itself for all of its available services. In one specific embodiment, the Extensible Markup Language (XML) provides a simple, hierarchical messaging protocol whereby the required service components are described, filed, and updated by existing applications.

In yet another embodiment, the dispatch server provides currently available service information to clients who send service inquiry requests to the dispatch server. In this way, clients find out about (i.e. discover) services offered by the dispatch server. In one specific embodiment, a client can inquire about a reserved service, such as a service named "info," from the dispatch server. After receiving this inquiry, the dispatch server would return information about itself to the client. Further, if the "info" service is called with a "services" parameter (which is a reserved parameter name for the reserved service "info"), then the dispatch server will directly respond to the client with a list of published services, their names, required parameters, a description, and human contact information. In another embodiment, the service inquiry (i.e. discovery) process is also at least partially automated. In this embodiment, an XML-enabled interface is provided, such that clients inquire which services are available, and how to access them.

Figure 8:
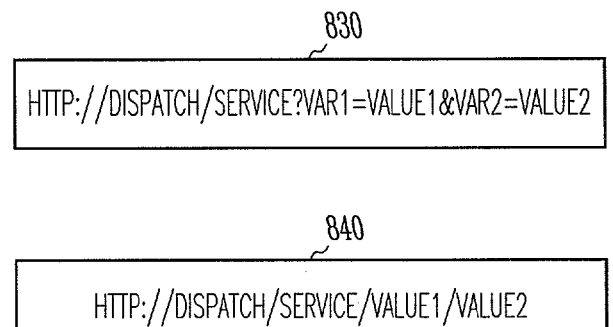
FIG. 8 is a textual view of an example of service invocation compression according to one embodiment of the present invention.

FIG. 8 is a textual view of an example of service invocation compression according to one embodiment of the present invention. In this example embodiment, service invocation 830 is compressed into a smaller service invocation 840. Both service invocations 830 and 840 of the present embodiment are in Uniform Resource Locator (URL) format. It is widely known that some web browsers and servers limit the length of a URL to 255 characters, which in turn limits the amount of information that can be passed to an application via the path or GET method. Because the web dispatch service limits the amount of information required in the links, the service also has the effect of compressing a URL (such as in a service invocation), which is to say that more information can be implicitly communicated in less space. Service invocation 830 includes two GET method parameters, "var1" and "var2". The "var1" parameter is set equal to "value1" and the "var2" parameter is set equal to "value2." Service invocation 840 takes full advantage of URL compression via parameter translation. The values "value1" and "value2" are passed directly in the service invocation, thus making service invocation 840 more compact.

Figure 9:
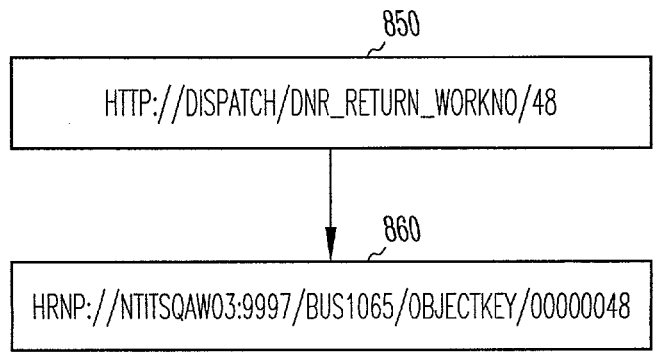
FIG. 9 is a textual view of an example of service request translation and parameter formatting according to one embodiment of the present invention.

Additional decoupling is available between calling and target applications if the dispatch server provides parameter formatting. This not only removes the burden of parameter formatting from the calling application, but also eliminates the need to possibly support multiple formatting of the same parameter for different target applications. FIG. 9 is a textual view of an example of service request translation and parameter formatting according to one embodiment of the present invention. In this embodiment, service request 850 is translated into content request 860, such that one of the parameters of the service request is properly formatted. Service request 850 includes a DnR service. Although FIG. 9 (and some of the other figures and portions of the present specification) make reference to DnR capabilities of Top Tier's Drag and Relate, these figures are used only as examples to show the utility of these embodiments of the present invention in various operating environments. Top Tier's Drag and Relate technologies are in no way associated with, or required by, these embodiments of the present invention. They are shown in the figures and further described only to exemplify the flexibility of use of a dispatch server in certain operating environments of these embodiments.

To send content request 860 to a DnR server, the DnR server requires the employee number to be an 8 digit integer with zero left padding. (In this scenario, DnR server is a content server.) In this instance, the formatting is performed by the dispatch server, and the formatting code is eliminated from the employee lookup program (i.e. client). FIG. 9 shows the format of the call to the dispatch server and the URL that is re-directed back to the client. We assume that the service "dnr_return_workno" has been previously registered with the dispatch server and in doing so, the format of the parameter is specified as an 8 digit integer with zero left padding. Content request 860 is a DnR link, where "hrnp://" is the Hyper Relational Navigation Protocol (for Top Tier Drag and Relate). "ntitsqaw03:9997" is the server (on port 9997 in this case). "BUS1065" is the name of the object. "OBJECTKEY" is the name of the objectid. And "00000048" is the parameter formatted that is being drag and related for employee number 48.

Figure 10:
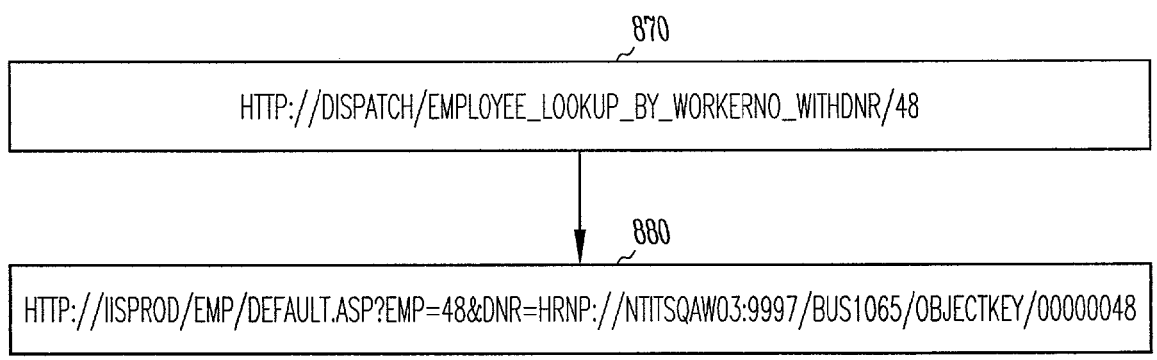
FIG. 10 is a textual view of an example of service request translation and parameter defaults according to one embodiment of the present invention.

It should be noted that the example shown in FIG. 9 is somewhat artificial, in that DnR links in DEAs (DnR Enabled Applications) are only meant, as the name implies, to be drug to a DnR aware server and not simply clicked on as are other HTML links. Therefore, the client cannot return content request 860 as specified above. The link shown must be available as is so it is dragable (i.e., since we don't actually click on the link, it can't be sent to the dispatch server for interpretation). In FIG. 10, we present another embodiment of the dispatch server and demonstrate a more legitimate way to engage the dispatch server to remove DnR intelligence from DEAs.

Another key feature of another embodiment of a dispatch server is accepting a service request from a client that has only a subset of a target application's required parameters. This is to say that the dispatch server can provide default parameters if they are omitted. Continuing with the example embodiment above in FIG. 9, our goal is to remove intelligence from the employee lookup program (i.e. client), yet still allow it to be fully DnR enabled. The worker information is dynamic and must be passed to the employee lookup program in each call. However, the DnR information is static and constant across all calls. FIG. 10 is a textual view of an example of service request translation and parameter defaults according to one embodiment of the present invention. In this embodiment, service request 870 is translated into application link 880. We define a variable DNR that if present (via the GET or POST method) indicates to a target application that it is in DnR mode. We can further require that the value of the DnR variable be the DnR enabled link that the application must display. In FIG. 10, the embodiment of the dispatch server's parameter completion feature further removes intelligence from the calling application. In FIG. 10, we assume that the service "employee_lookup_by_workerno_withDNR" has been previously defined with two parameters, one being the required employee number (emp), and also a second optional parameter (DNR) with a default value of "hrnp://ntitsqaw03: 9997/BUS1065/OBJECTKEY/#PARAM#emp". Here, the "#PARAM#" string tells the dispatch server to substitute the value of another, non-default parameter, which in this case is "emp" that has a value of 48. When registering this application, we also expect that the default "DNR" parameter was specified to require left-zero formatting.

Figure 11:
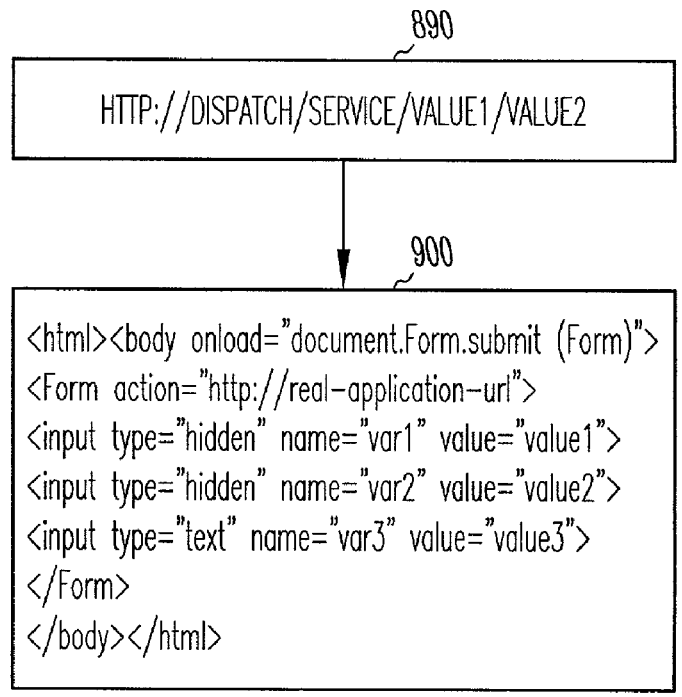
FIG. 11 is a textual view of an example of service request and method translation using form data according to one embodiment of the present invention.

FIG. 11 is a textual view of an example of service request and method translation using form data according to one embodiment of the present invention. In this embodiment, the dispatch server is able to handle the case when a target application (on a service provider) is expecting parameters via the POST method. Dispatch server translates service request 890 into application link 900, wherein application link 900 includes the required POST method parameters with the form's "action" variable set to the target application's URL. In addition, application link 900 also includes an invocation of the "onload" event that calls the form's "submit" method. As soon as the form is received by the client from the dispatch server, it is immediately submitted, which is consistent with the redirect method used with the GET and path parameters (directly passed in the URL path) described in earlier embodiments of the invention. The two parameter values "value1" and "value2" are passed to the dispatch server via the path method have been translated to POST method variables via the form, and that a third parameter "var3" has been added as well. This third parameter is required by the application and automatically supplied by dispatch using parameter completion with its default value, "value3". In this embodiment, additional bookmarking of applications is also allowed with the type of form data shown in application link 900. Typically, applications requiring POST method parameters cannot be bookmarked (or saved as a URL favorite), because there is no way to store the parameters in the URL, which is all that is saved in a bookmark. By allowing the parameters to be specified in a URL and later converted via the dispatch server to the expected POST method, an application that previously did not support bookmarking now does.

Figure 12:
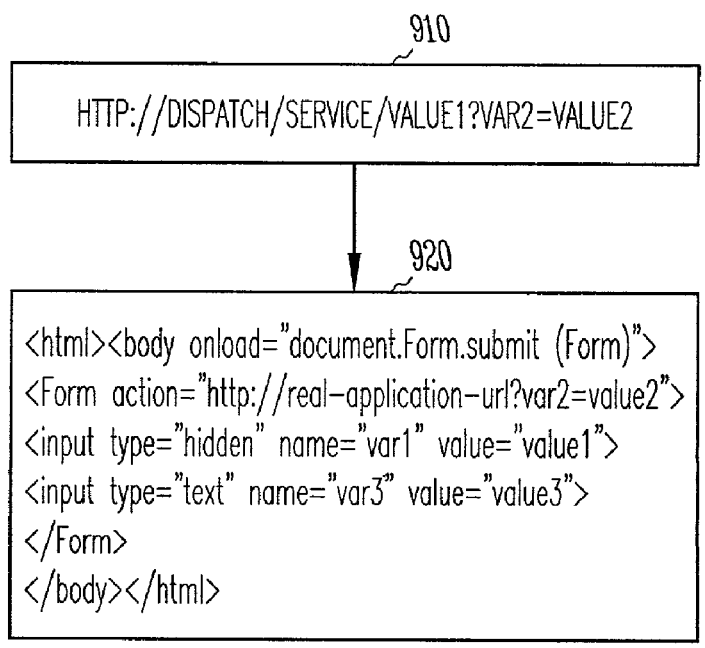
FIG. 12 is a textual view of an example of service request and method translation parameter transparency according to another embodiment of the present invention.

FIG. 12 is a textual view of an example of service request, method translation, and parameter transparency according to another embodiment of the present invention. In this embodiment, if path or parameter information is passed to the dispatch server for which no associated parameters are listed, then the dispatch server will simply pass on the path or parameter information in the same manner in which it was received. This provides maximum flexibility for migrating links to take full advantage of the dispatch service. In FIG. 12, service request 910 having GET parameters ("var1" is implicitly provided by "value1," and "var2" is explicitly provided as "value2") is translated into POST method application request 920. In this embodiment, "var2" is not defined in the service database of the dispatch server, and thus it is simply passed along transparently as a parameter from service request 910 into application request 920, while "value1" is translated into a POST method parameter, and "value3" is supplied as a default value.

In another embodiment of the present invention, the dispatch server provides source routing. In this embodiment, service requests are translated into application requests just as before. However, during the translation process, the dispatch server determines the geographic location of the requesting client and one or more application servers that provide the requested service. That is to say, there can be many application servers in different geographic locations that provide the requested service. Source routing occurs when the dispatch server determines the closest application server to the requesting client when translating a service request and redirecting an application request back to the client. For example, in a specific embodiment, application servers in the United States, Italy, and Japan all provide a common service of "employee_stock_quoting." A client in Italy sends a service request for "employee_stock_quoting" to the dispatch server. The dispatch server will achieve source routing by assessing the client's location (Italy), and determining that the nearest application server that provides the requested service is the one in Italy. The dispatch server will redirect an application request back to the client, wherein the application request includes the address of the application server in Italy.

In another embodiment, the dispatch server uses a load-balancing strategy when choosing the appropriate application server and thereby creating an application request. In this way, routing of requests is achieved to maximize the load-balancing strategy used by the dispatch server. This occurs when multiple application servers in a given geographic location provide the requested service. The dispatch server implements a load-balancing strategy to determine which application server will handle the application request. In one embodiment, the load-balancing strategy includes a round-robin strategy.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited by the claims and the equivalents thereof.

What is claimed is:

1. A dispatch server comprising:
a data store having one or more application service definitions, wherein each application service definition includes a service name and one or more service data entries for a service registered with the dispatch server and located on an application server coupled to the data store; and
a dispatch processor operatively coupled to the data store, wherein the dispatch processor is programmed to translate a service request into an application request, the service request being received from a client and including a name of the dispatch server that is provided by the client and a name of the service registered with the dispatch server, wherein the translation is at least partially based on one of the application service definitions, wherein the dispatch processor is to redirect the application request back to the client without processing the application request and without sending the application request to the application server having the service to be invoked by the service request; and wherein the application request includes only the application request relevant to the service to be invoked by the service request.

2. The dispatch server of claim 1, wherein the dispatch processor is further programmed to subsequently translate the service request into a different application request, wherein the subsequent translation is at least partially based on a changed application service definition.

3. The dispatch server of claim 1, wherein the dispatch processor is further programmed to manage a user interface, wherein the user interface includes a service registration interface, a service modification interface, and a service deletion interface.

4. The dispatch server of claim 1, wherein the dispatch server is located on the World Wide Web.

5. A method for accessing an application owner, the method comprising:
receiving a service command from a requestor at a dispatch server, the service command including a name of the dispatch server that is provided by the requestor and a service name for a service registered with the dispatch server;
processing the service command on the dispatch server;
translating the service command on the dispatch server into an application request, wherein the translation is at least partially based on a service definition stored on the dispatch server; and
redirecting the application request to the requestor without processing the application request at the dispatch server and without sending the application request from the dispatch server to an application server having the service to be invoked by the service command, wherein redirecting the application request includes sending only the application request relevant to the service to be invoked by the service request.

6. The method of claim 5, further comprising sending the application request from the requestor to the application owner.

7. The method of claim 5, wherein the processing of the application request comprises:
sending the application request from the dispatch server to the application owner;
sending an application response from the application owner to the dispatch server; and
sending the application response from the dispatch server to the requestor.

8. The method of claim 5, wherein the processing of the service command includes validating the service command, and checking the service command for parameters.

9. The method of claim 5, wherein the service command includes a Universal Resource Locator.

10. A method for accessing a complex web link, the method comprising:
receiving a service request from an end-user at a dispatch server, the service request including a name of the dispatch server that is provided by the end user and a service name for a service registered with the dispatch server;
translating the service request into a complex application command, wherein the translating is at least partially based on a service definition stored on the dispatch server;
redirecting the complex application command from the dispatch server to the end-user without processing the complex application command at the dispatch server and without sending the complex application command from the dispatch server to a service provider having the service to be invoked by the service request, and wherein redirecting the complex application command includes sending the complex application command relevant to the service to be invoked by the service request;
sending the complex application command from the end-user to the service provider; and
sending an application response from the service provider to the end-user.

11. A system comprising:
a dispatch server comprising:
a data store; and
a processor programmed to translate a service request into an application command, wherein the translation is at least partially based on a service definition stored in the data store and the processor is operable to redirect the application command back to a service user operatively coupled to the dispatch server without processing the application command and without sending the application command to an application server having a service to be invoked by the service command, wherein the application command includes only the application command relevant to the service to be invoked by the service command; and
wherein the service user sends the service request to the dispatch server, wherein the service request includes a name of the dispatch server that is provided by the service user and a service name for a service registered with the dispatch server, and wherein the dispatch server translates the service request and redirects the application command to the service user.

12. The system of claim 11, wherein the system is located on the World Wide Web.

13. The system of claim 11, wherein the system further includes an independent service management server.

14. The system of claim 13, wherein the independent service management server includes a processor programmed to manage a service registration interface, a service modification interface, and a service deletion interface.

15. A computer-readable medium having instructions stored thereon to perform a computerized method comprising:
receiving a service invocation from an end-user to a dispatch server, the service invocation including a name of the dispatch server that is provided by the end user and a service name for a service registered with the dispatch server;
processing the service invocation on the dispatch server;
translating the service invocation on the dispatch server into an application command, wherein the translating is at least partially based on a service definition stored on the dispatch server; and
redirecting the application command to the end-user without processing the application command at the dispatch server and without sending the application command from the dispatch server to an application server having the service to be invoked by the service invocation, wherein redirecting includes sending only the application command relevant to the service to be invoked by the service invocation.

16. The computer-readable medium of claim 15, wherein the processing of the service invocation includes validating the service invocation.

17. The computer-readable medium of claim 15, wherein the processing of the service invocation includes checking the service invocation for parameters.

18. A method for source routing on a web dispatch server, the method comprising:
sending a service command from a requestor at the web dispatch server, the service command including a name of the web dispatch server that is provided by the requestor and a service name for a service registered with the web dispatch server;
determining which application server that provides the requested service is geographically closest to the requestor;
translating the service command into an application request, wherein the translating is at least partially based on the determination of the geographically closest application server; and
redirecting the application request back to the requestor without processing the application request and without sending the application request to the application server having the service to be invoked by the service request, wherein the application request includes only the application request relevant to the service to be invoked by the service request.

19. A computer-readable medium having instructions stored thereon, which when executed by a computer, cause the computer to perform a computerized method comprising:

receiving a service request from a requestor at a dispatch server, the service request including a name of the dispatch server and a registered service name that is provided by the requestor and a service name for a service registered with the dispatch server;

validating the service request;

checking the service request for parameters;

translating the service request on the dispatch server into an application request to an application server, wherein the translating is at least partially based on a service definition stored on the dispatch server; and redirecting the application request back to the requestor without processing the application request at the dispatch server and without sending the application request from the dispatch server to an application server having the service to be invoked by the service request, wherein the application request includes only the application request relevant to the service to be invoked by the service request.

20. The dispatch server of claim 1, wherein the application request includes a complex address.

* * * * *